(12) United States Patent
Koehl et al.

(10) Patent No.: US 11,440,739 B2
(45) Date of Patent: Sep. 13, 2022

(54) PORTABLE BELT CONVEYOR SYSTEM, METHODS AND APPARATUS

(71) Applicant: Superior Industries, Inc., Morris, MN (US)

(72) Inventors: Tom Koehl, Morris, MN (US); Philip Rosen, Morris, MN (US); Travis Thooft, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 17/203,104

(22) Filed: Mar. 16, 2021

(65) Prior Publication Data
US 2021/0284460 A1 Sep. 16, 2021

Related U.S. Application Data

(60) Provisional application No. 62/990,308, filed on Mar. 16, 2020.

(51) Int. Cl.
*B65G 41/00* (2006.01)
*B60P 3/035* (2006.01)

(52) U.S. Cl.
CPC ........... *B65G 41/008* (2013.01); *B60P 3/035* (2013.01); *B65G 2201/0235* (2013.01); *B65G 2812/02029* (2013.01)

(58) Field of Classification Search
CPC ..... B60P 3/035; B65G 41/008; B65G 41/005; B65G 41/002; B65G 201/0235; B65G 2812/02029

USPC .......................................... 198/312, 313, 581
See application file for complete search history.

(56) References Cited

U.S. PATENT DOCUMENTS

| | | | | |
|---|---|---|---|---|
| 3,228,516 A * | 1/1966 | Sheehau | ............... | B65G 21/14 198/313 |
| 4,860,878 A * | 8/1989 | Mraz | ..................... | B65G 21/14 198/594 |
| 5,181,600 A * | 1/1993 | Chappell | ............... | B65G 21/14 198/309 |
| 5,938,004 A * | 8/1999 | Roberts | .................. | B65G 21/14 198/594 |
| 6,095,320 A * | 8/2000 | DeMong | ............... | B65G 15/26 198/841 |
| 6,488,145 B1 * | 12/2002 | Diego | ................... | B65G 43/08 198/581 |
| 7,308,968 B2 | 12/2007 | Denison | | |
| 7,823,715 B2 * | 11/2010 | Kinnunen | ............. | B65G 21/14 198/588 |
| 8,833,539 B2 | 9/2014 | Fehr et al. | | |
| 9,156,617 B2 | 10/2015 | Fehr et al. | | |
| 9,694,985 B2 | 7/2017 | Fehr et al. | | |
| 10,358,297 B2 | 7/2019 | Fehr et al. | | |
| 10,787,327 B2 * | 9/2020 | Yin | ........................ | B63B 27/22 |

(Continued)

*Primary Examiner* — James R Bidwell
(74) *Attorney, Agent, or Firm* — Todd R. Fronek; Larkin Hoffman Daly & Lindgren, Ltd.

(57) ABSTRACT

Conveyors are disclosed having transport and operational configurations. Some embodiments include conveyor sections supportable on an upper support rail. Some embodiments are sized to be transported in a conveyor. Some embodiments include conveyor sections slidingly engaged with one another. Some embodiments include a reel for supporting a conveyor belt. Some embodiments include individually foldable conveyor sections.

19 Claims, 10 Drawing Sheets

(56) References Cited

U.S. PATENT DOCUMENTS

2016/0016736 A1* 1/2016 Fehr .................. B65G 39/16
198/313

* cited by examiner

PORTABLE BELT CONVEYOR SYSTEM, METHODS AND APPARATUS

BACKGROUND

Conveying equipment such as belt conveyors are used to convey material (e.g., aggregate material). Some conveying equipment is transportable (e.g., over the road and/or within a working area).

DESCRIPTION

Conveyors are disclosed herein having transport and operational configurations. Some embodiments include conveyor sections supportable on an upper support rail. Some embodiments are sized to be transported in a conveyor. Some embodiments include conveyor sections slidingly engaged with one another. Some embodiments include a reel for supporting a conveyor belt. Some embodiments include individually foldable conveyor sections.

The various conveyor embodiments described herein may have common features and/or functionality with those embodiments described in U.S. Pat. No. 9,156,617, hereby incorporated by reference herein in its entirety.

Figure 1A:
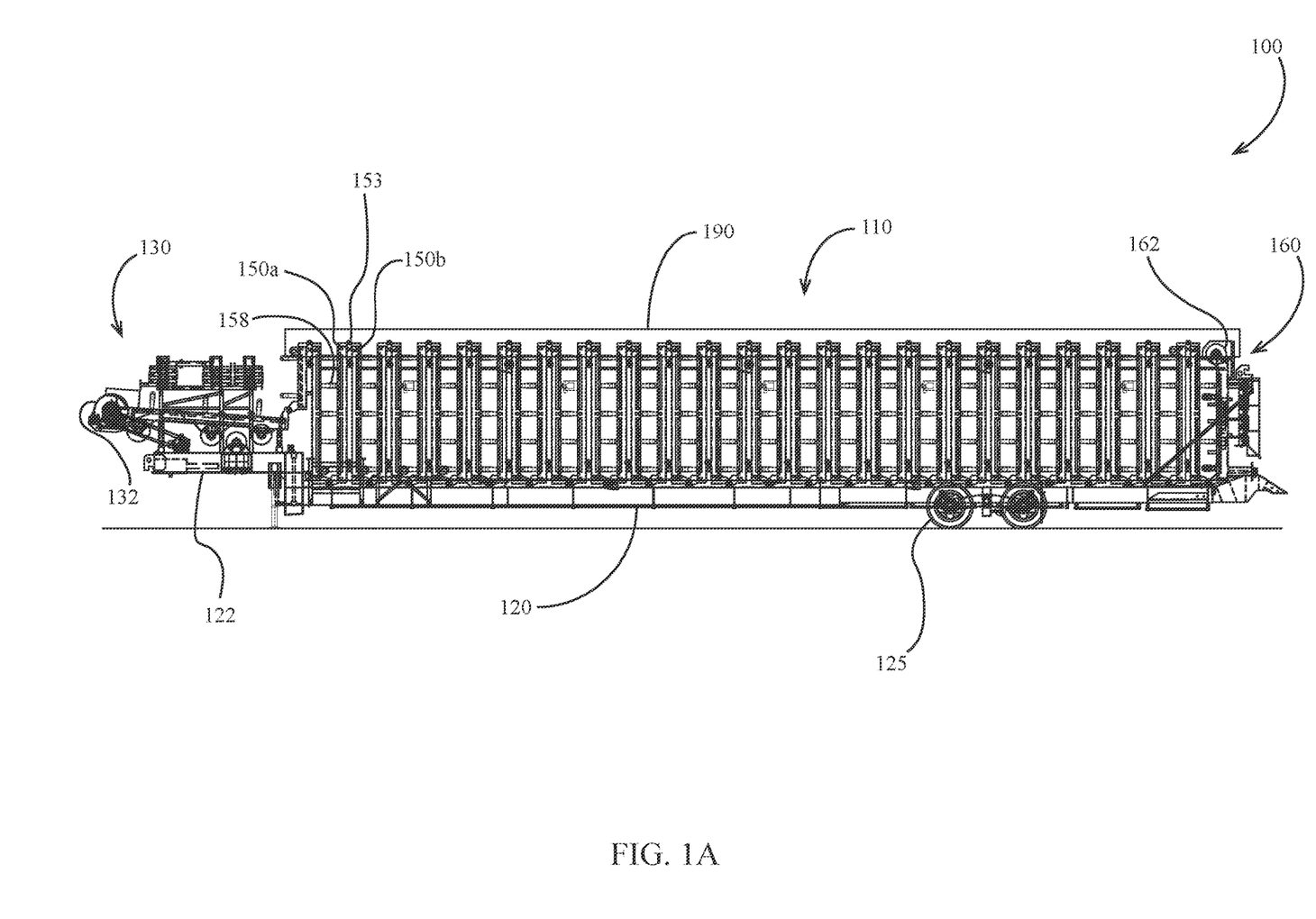
FIG. 1A is a side elevation view of an embodiment of a conveyor in a transport configuration.

Referring to the drawings, wherein like reference numerals designate identical or corresponding parts throughout the several views, FIG. 1A illustrates an embodiment of a conveyor 100 in a transport configuration. The conveyor optionally includes a head section 130 rollingly supporting a head pulley 132 and a tail section 160 rollingly supporting a tail pulley 162. It should be appreciated that in the various embodiments described herein, the positions of the tail and head pulleys may be reversed. The head section 130 is optionally supported on a forward end 122 of a vehicle 120 (e.g., a trailer such as a towed transport trailer having a plurality of wheels 125). In some embodiments, the vehicle 120 is optionally appropriately dimensioned for road transport. The vehicle 120 optionally includes one or more upper rails 190. The head section 130 is optionally connected (e.g., pivotally coupled) to a folding conveyor body 110 comprising a plurality of conveyor sections 150, each conveyor section comprising one or more conveyor idler assemblies 158 (e.g., troughed idler assemblies, etc.) configured to cooperatively support at least a portion of a conveyor belt (e.g., endless belt). The folding conveyor body 110 is optionally folded (e.g., accordion-folded) in the transport configuration. Adjacent conveyor sections 150 (e.g., section 150a, 150b) are optionally pivotally coupled to one another (e.g., by pivots 153) to enable folding of the conveyor body 110. In some embodiments, the conveyor body 110 is at least partially supported on the upper rail 190 in the transport configuration; for example, each conveyor section is optionally slidingly coupled to the upper rail in the transport configuration. In some embodiments, the pivots 153 (e.g., comprising rods which optionally have a greater width than the conveyor sections 150) are slidingly coupled to the upper rail 190 in the transport configuration.

Figure 1B:
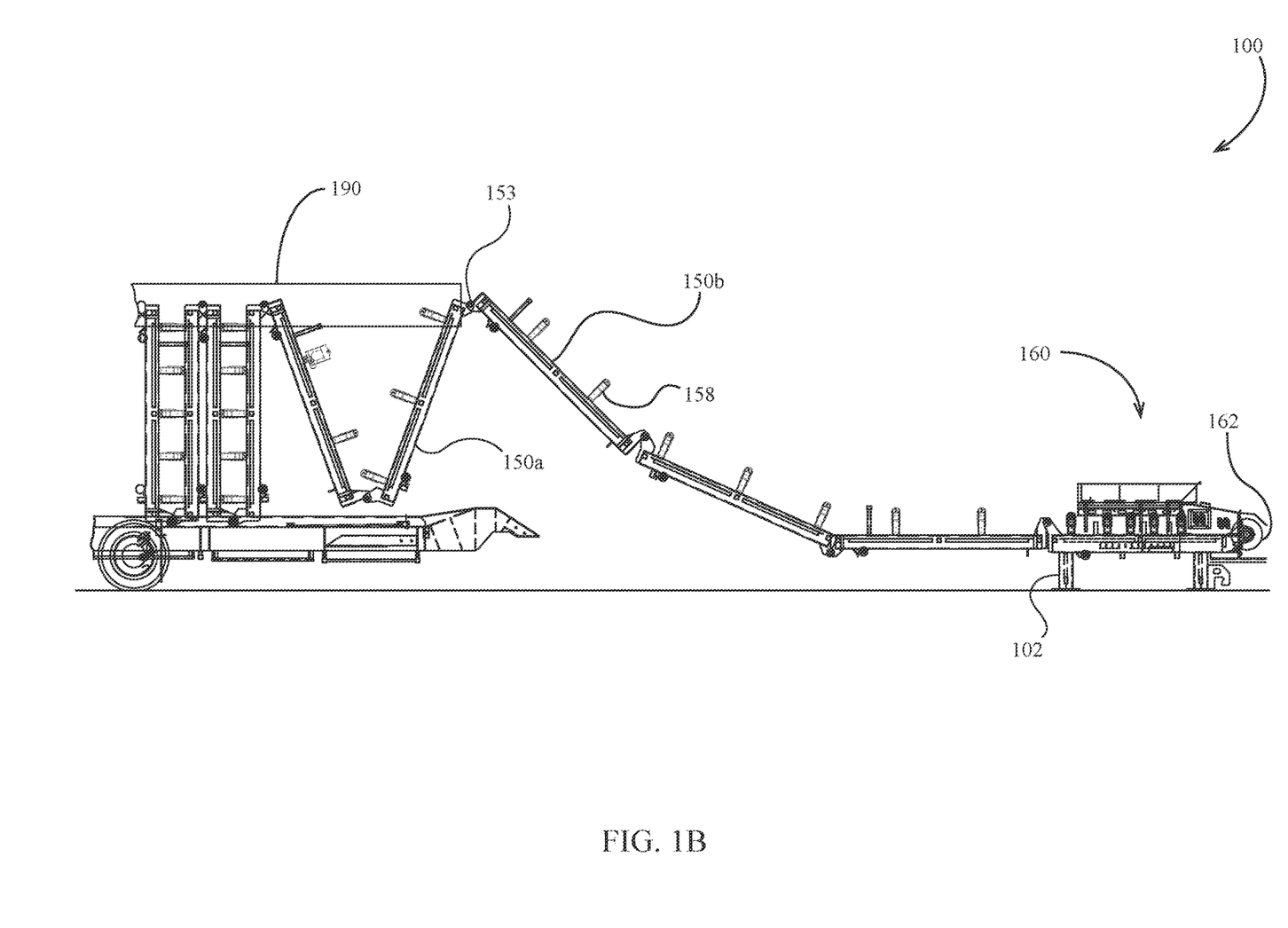
FIG. 1B is a side elevation view of the conveyor of FIG. 1A in a transitional configuration.

Referring to FIG. 1B, the conveyor 100 is illustrated in a transitional configuration between transport and operational configurations. During the transition from the transport to operational configuration, pairs of adjacent conveyor sections 150a, 150b optionally pivot away from one another about pivots 153. During the transition from the transport to operational configuration, conveyor sections 150 optionally slide rearward along rail 190. Tail section 160 and one or more conveyor sections 150 are optionally supported on the ground surface in the operational configuration, e.g., by one or more support legs 102.

Figure 2:
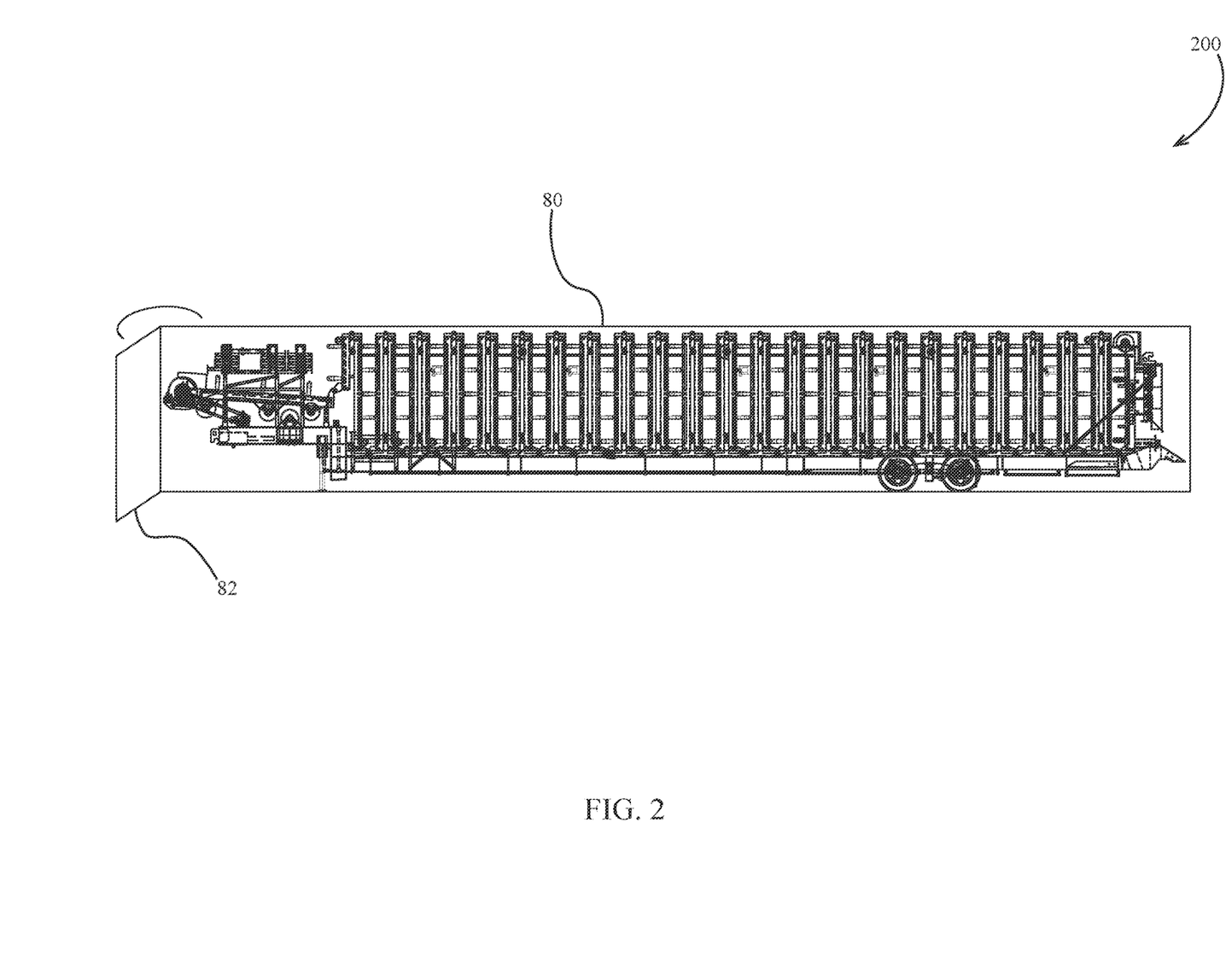
FIG. 2 is a side elevation view of another embodiment of a conveyor in a transport configuration in an embodiment of a transport container.

Referring to FIG. 2, another embodiment of a conveyor 200 is illustrated in a transport configuration stored in a container 80 (e.g., sea container, shipping container, transport container, cargo trailer, etc.). The conveyor 200 is optionally generally similar to the conveyor 100. In some embodiments, a height of the conveyor 100 in the transport configuration is optionally less than a standard container height dimension, e.g., a minimum height (and/or inlet door 82 height) of a standard container. The standard container height dimension may be 7.5 feet or approximately 7.5 feet (e.g., approximately 2.3 meters). A width of the conveyor 100 in the transport configuration is optionally less than a standard container width dimension, e.g., a minimum width (and/or inlet door 82 width) of a standard container. The standard container width dimension may be 7.5 feet or approximately 7.5 feet (e.g., approximately 2.3 meters). A length of the conveyor 100 in the transport configuration is optionally less than a standard container length dimension of a standard container. The standard container length dimension may be 40 feet or approximately 40 feet (e.g., approximately 12 meters).

Figure 3A:
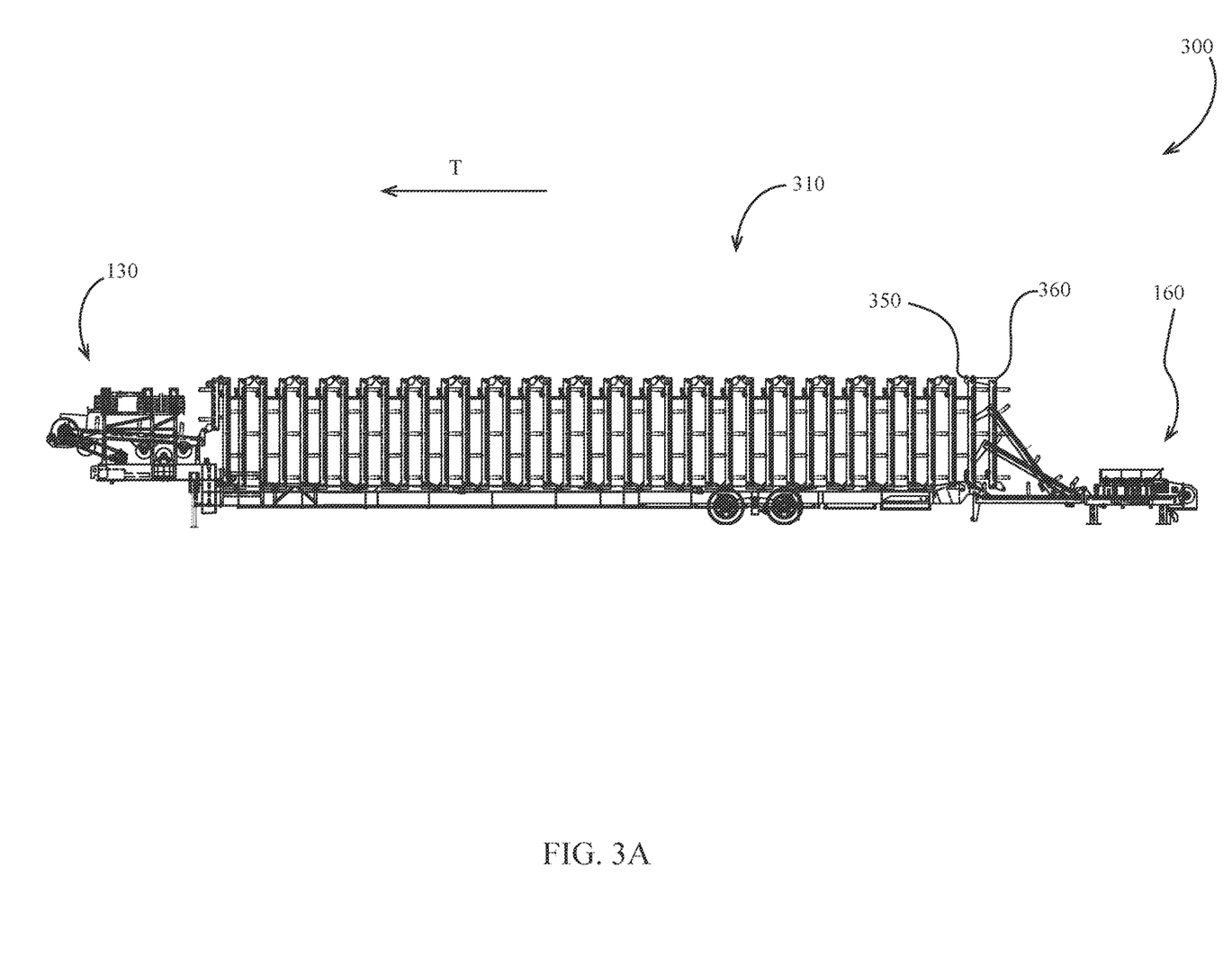
FIG. 3A is a side elevation view of another embodiment of a conveyor in a transport configuration.
Figure 3B:
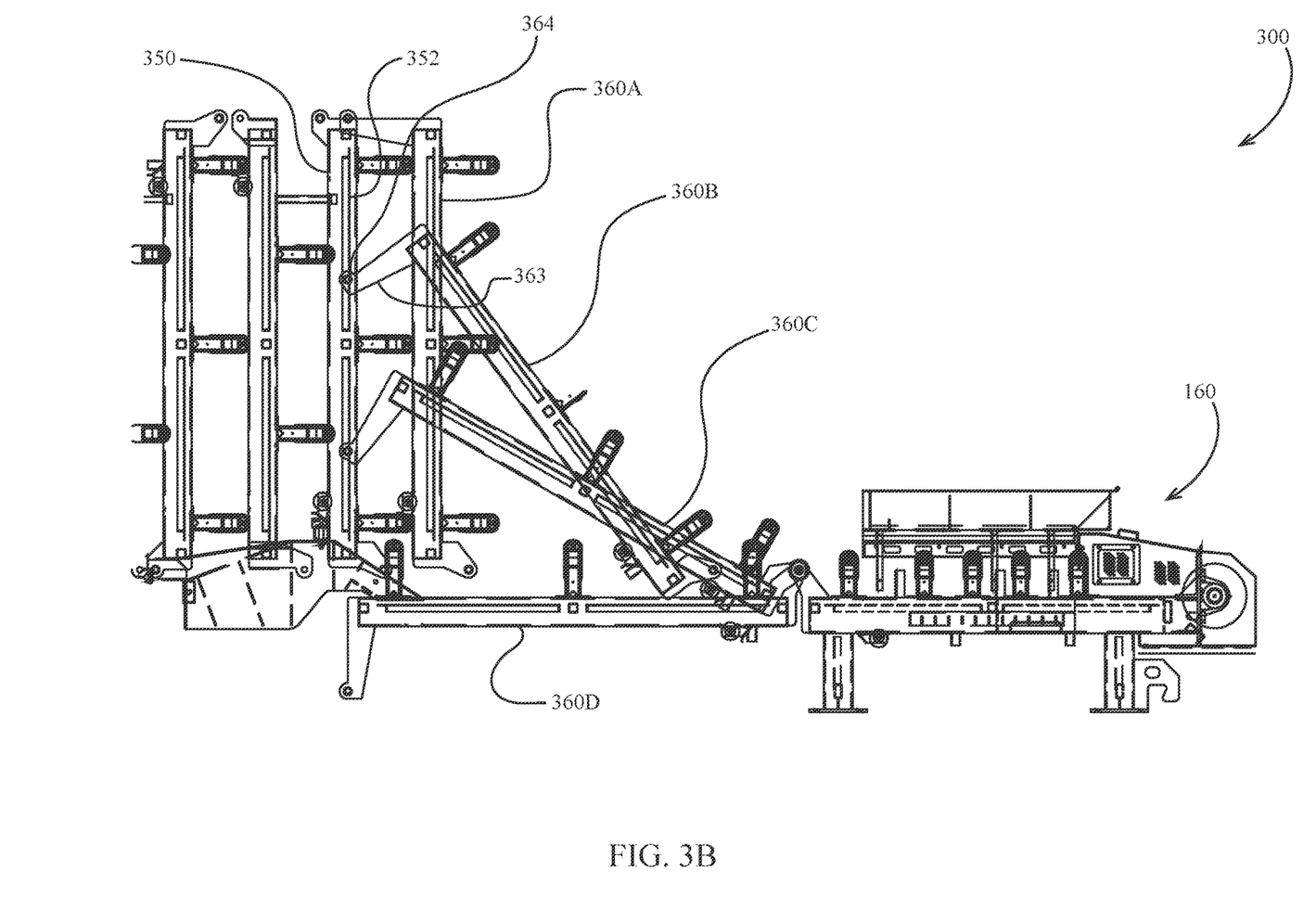
FIG. 3B is an enlarged partial side elevation view of the conveyor of FIG. 3A in a transport configuration.

Referring to FIGS. 3A and 3B, an embodiment of a conveyor 300 is illustrated in a transport configuration. The conveyor 300 is optionally generally similar to the conveyor 100. The conveyor 300 optionally has a conveyor body 310 comprising a plurality of conveyor sections. Each conveyor section is optionally slidingly engaged with an adjacent conveyor section. In some embodiments, a conveyor section 360 is rearward of an adjacent conveyor section 350 along the transport travel direction T. In some embodiments, a plate 363 mounted to the conveyor section 360 is slidingly engaged with an elongate slot 352 of conveyor section 350, e.g., by a pin 364 mounted to the plate 363.

Referring to FIG. 3B, in some embodiments, in the transport position the conveyor section 360 is in a generally vertical position labeled 360A. In some embodiments, the conveyor section 360 slides generally downward and rearward (e.g., through positions labeled 360B and 360C) to the position labeled 360D which is optionally maintained as the conveyor 300 completes reconfiguration into the operational configuration. In some embodiments, the pin 364 slides downward along slot 352 during movement of the conveyor section 360 into the position 360D. It should be appreciated that additional conveyor sections (e.g., conveyor section 350) similarly slide relative to forwardly adjacent conveyor sections in order to continue reconfiguring the conveyor 300 into the operational configuration. The forwardmost conveyor section 360 is optionally pivotally coupled to the head section or the tail section of the conveyor. The rearmost conveyor section is optionally pivotally coupled to the head section or the tail section of the conveyor.

Figure 4:
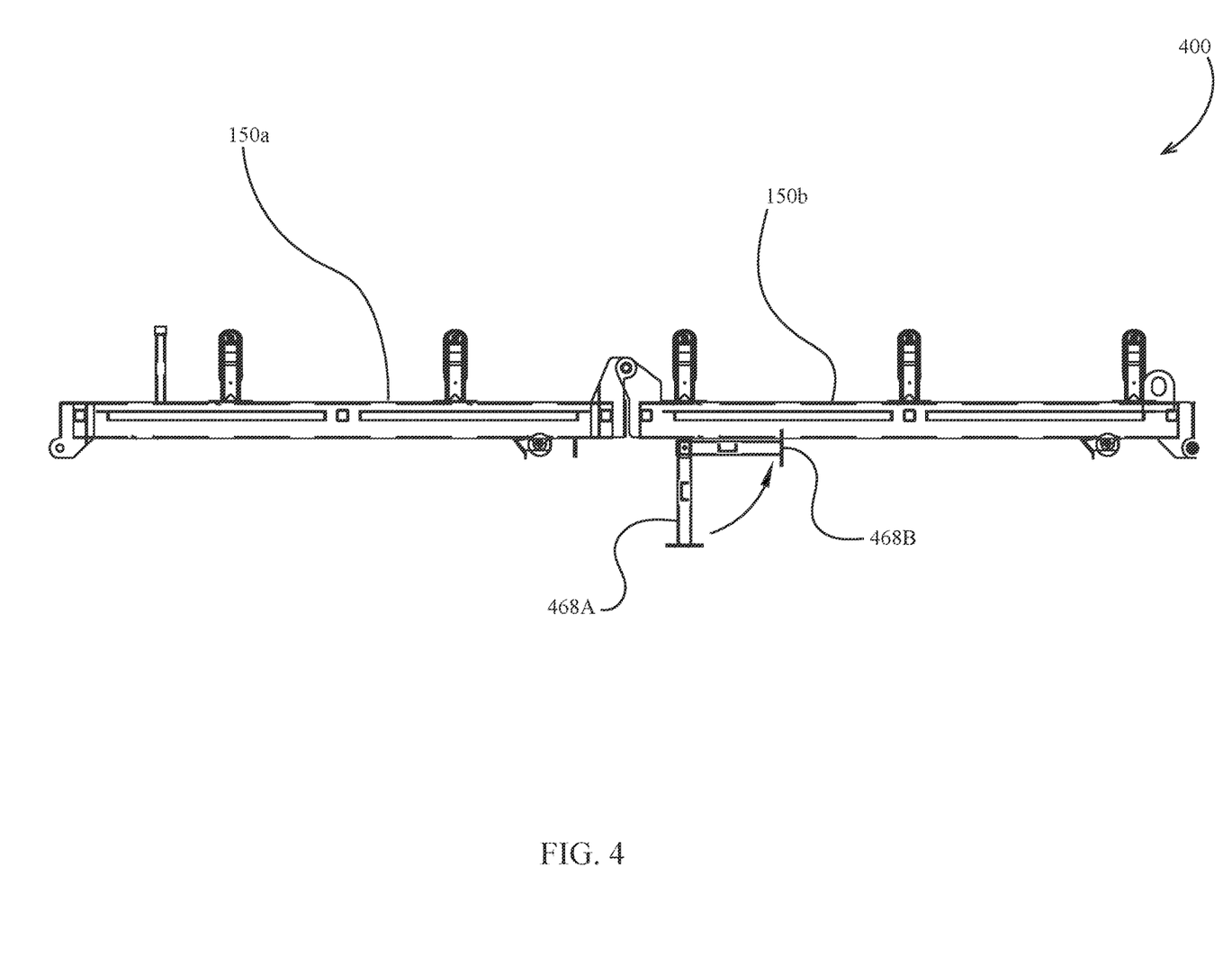
FIG. 4 is a side elevation view of another embodiment of a conveyor.

Referring to FIG. 4, a conveyor 400 which may be generally similar to any conveyor embodiment described herein. A support leg 468 is optionally pivotally coupled to one or more conveyor sections 150. The support leg 468 is optionally pivoted to a transport position 468B (e.g., generally aligned with the length of the conveyor section 150) in the transport configuration of the conveyor. The support leg 468 is optionally pivoted to an operational position 468A (e.g., generally perpendicular to the length of the conveyor section 150) in the operational configuration of the conveyor.

Figure 5A:
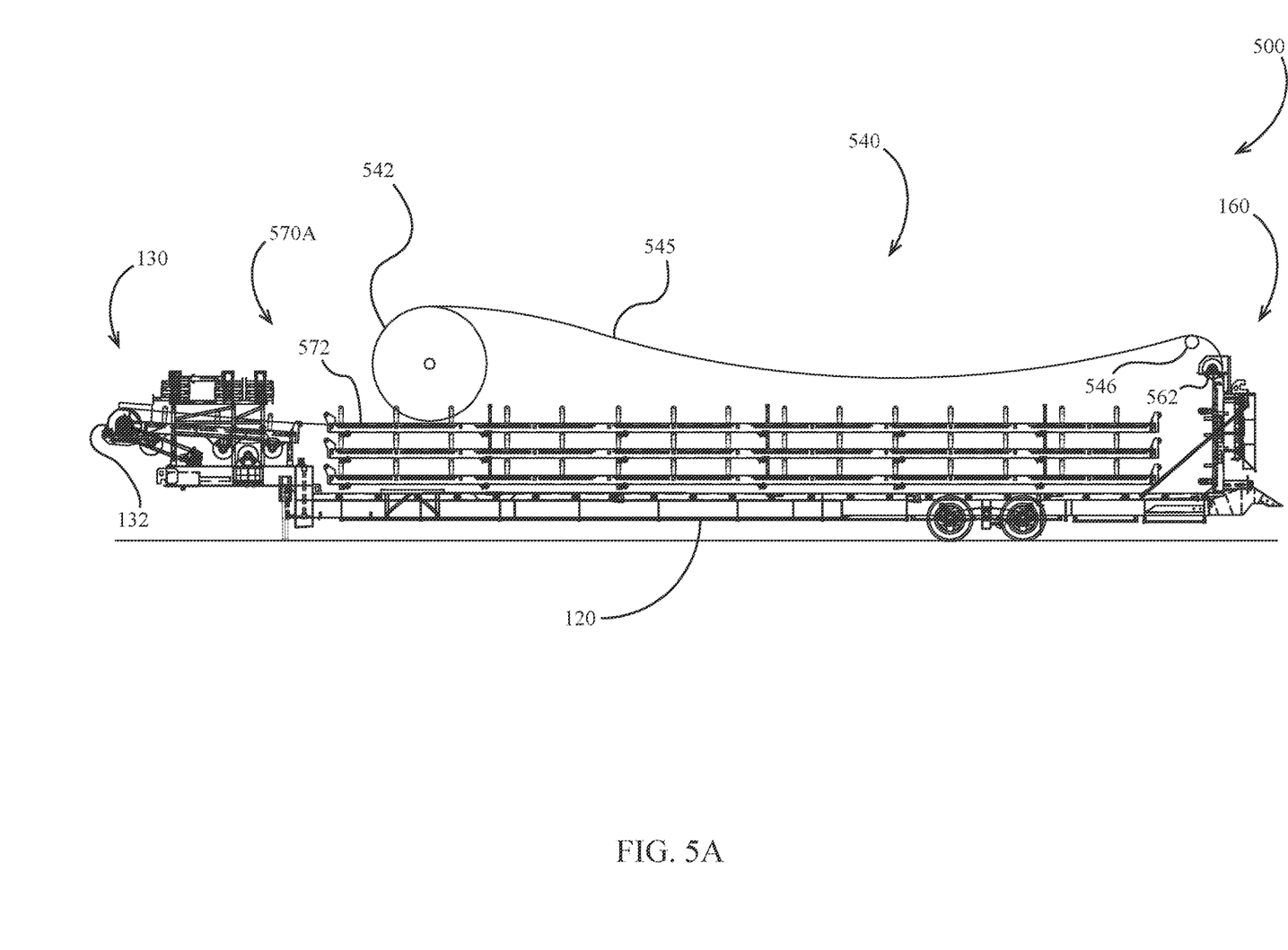
FIG. 5A is a side elevation view of another embodiment of a conveyor in a transport configuration.
Figure 5B:
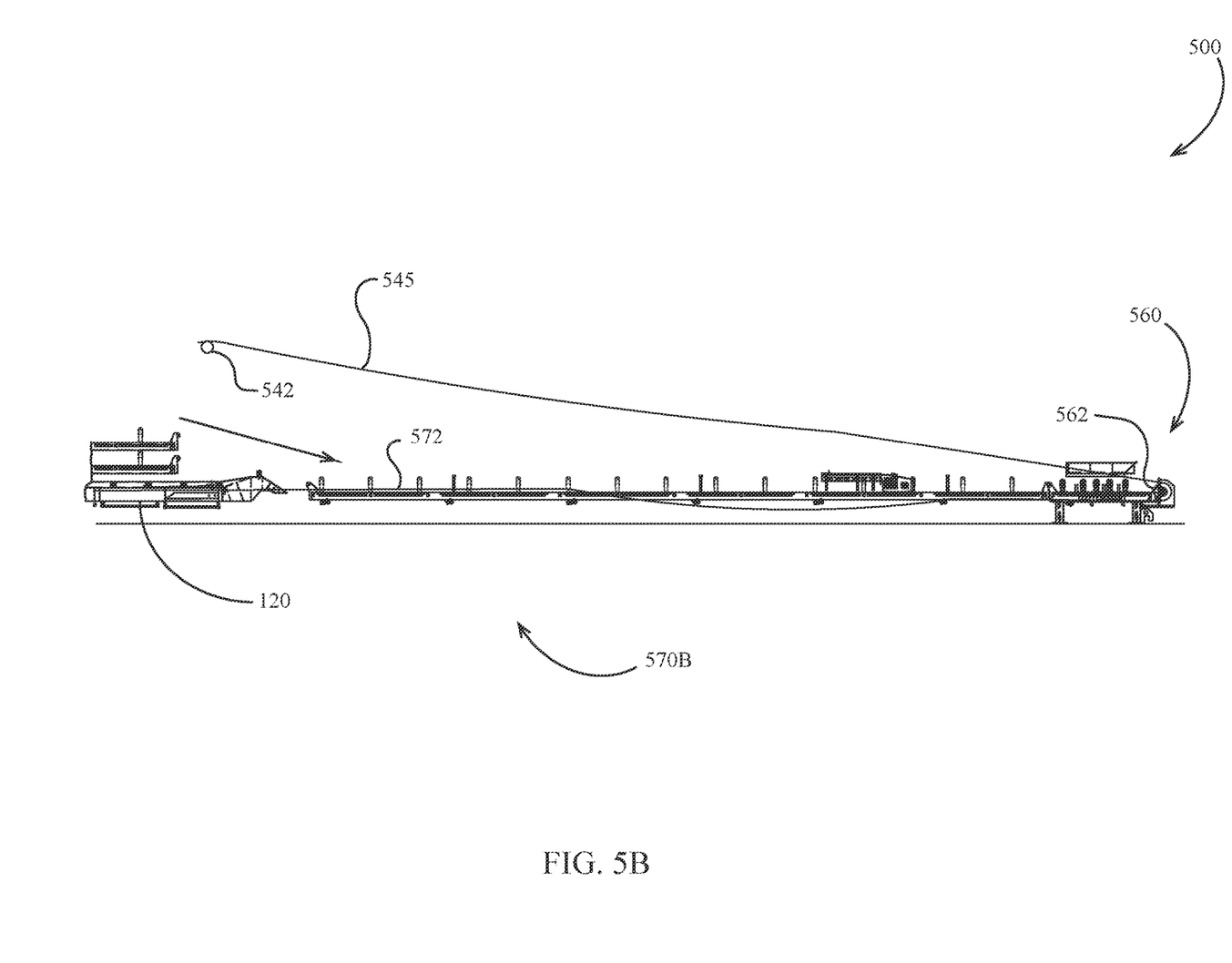
FIG. 5B is an enlarged partial side elevation view of the conveyor of FIG. 5A in a transport configuration.

Referring to FIGS. 5A and 5B, in some embodiments such as the conveyor 500 a reel system 540 may be supported on the vehicle 120 and used to store the conveyor belt 545 (e.g., endless conveyor belt) in the transport configuration. A reel 542 is optionally rollingly supported on the vehicle 120. The conveyor belt 545 is optionally reeled onto the reel 542 in the transport configuration of the conveyor body 570 in the transport configuration 570A and is optionally unreeled to support the belt on conveyor sections 572 of the conveyor body 570 in the operational configuration 570B (which is only partially configured in the transitional illustration of FIG. 5B). In some embodiments, the conveyor sections 572 are stacked (e.g., horizontally stacked) in the transport configuration. In some embodiments, the conveyer sections 572 are separate (e.g., not pivotally or slidingly coupled) in the transport configuration and are optionally coupled once they have been removed from vehicle 120 and placed in their transport positions on the ground. In some embodiments, the reel system 540 includes a roller 546 (e.g., supported on vehicle 120) for supporting the conveyor belt 545 as it is reeled onto the reel 542.

Figure 6A:
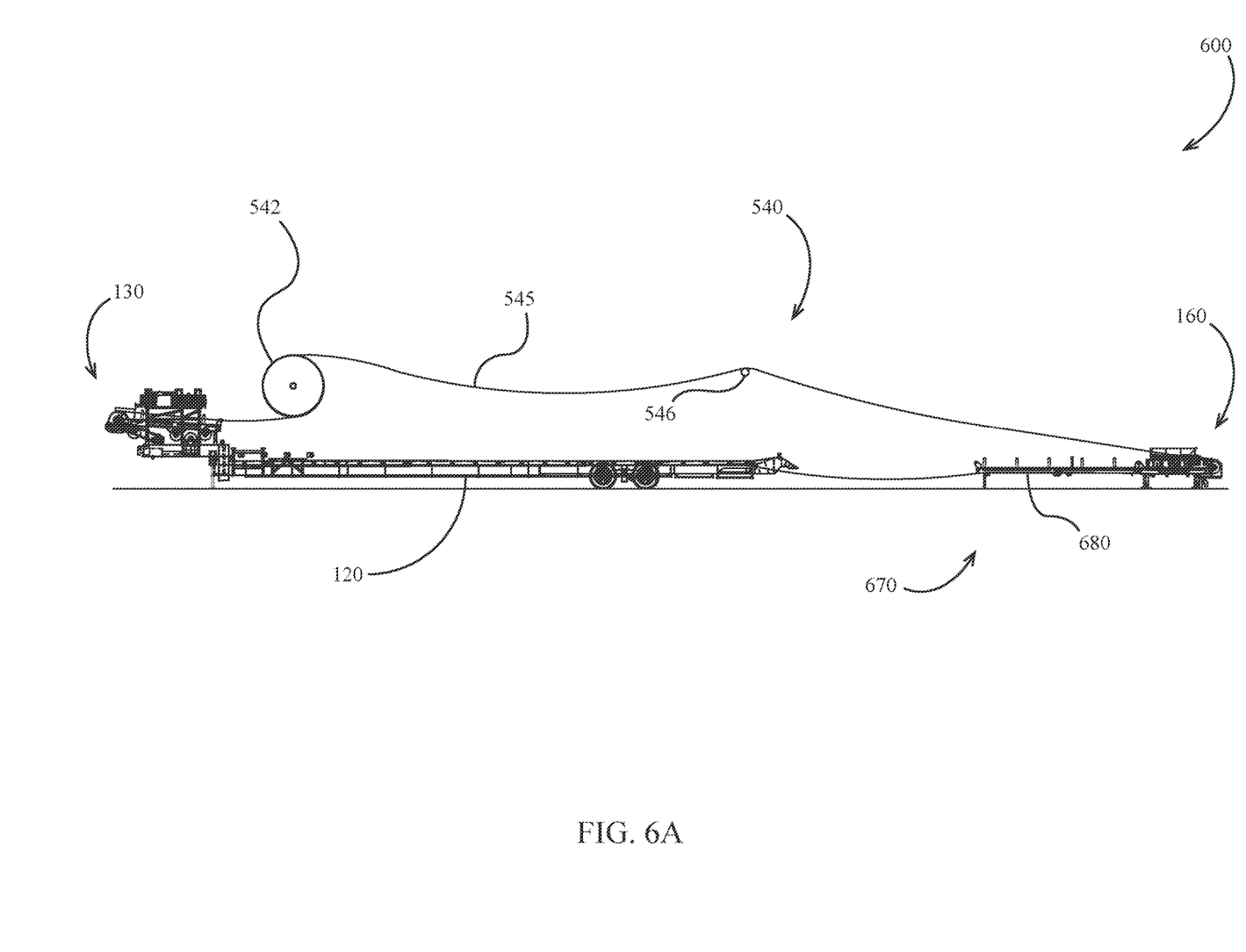
FIG. 6A is a side elevation view of another embodiment of a conveyor in a transitional configuration.

Referring to FIG. 6A, an embodiment of a conveyor 600 is optionally comprised of foldable conveyor sections 680. The conveyor sections 680 are optionally folded and stacked or otherwise disposed on the vehicle 120 in the transport configuration. The conveyor sections are optionally unfolded and aligned in the operational configuration to form a conveyor body 670. The conveyor 600 optionally includes a reel system 540 similar to that described with respect to the conveyor 500.

Figure 6B:
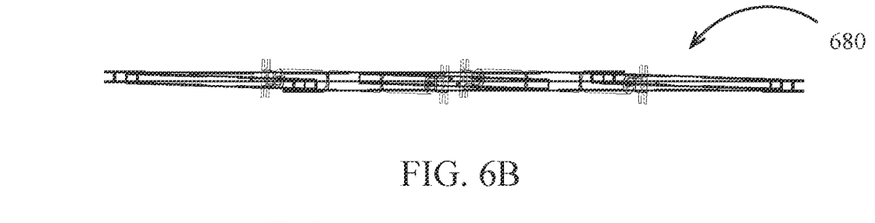
FIG. 6B is a top view of a conveyor section of FIG. 6A in a transport configuration.
Figure 6C:
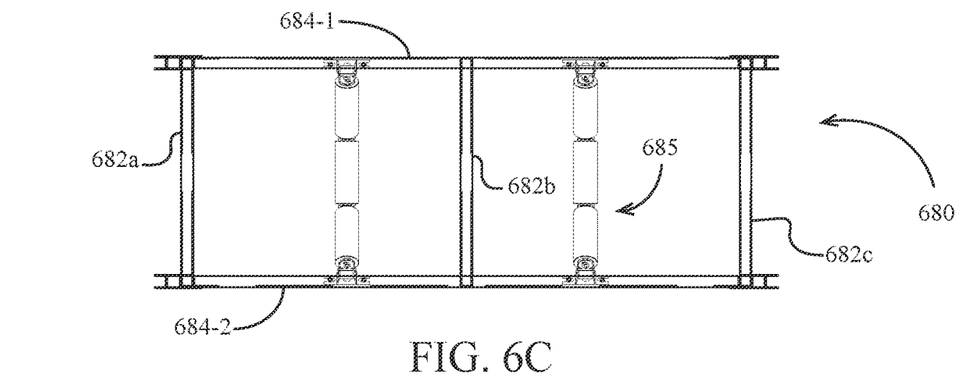
FIG. 6C is a top view of the conveyor section of FIG. 6B in an operational configuration.
Figure 6D:
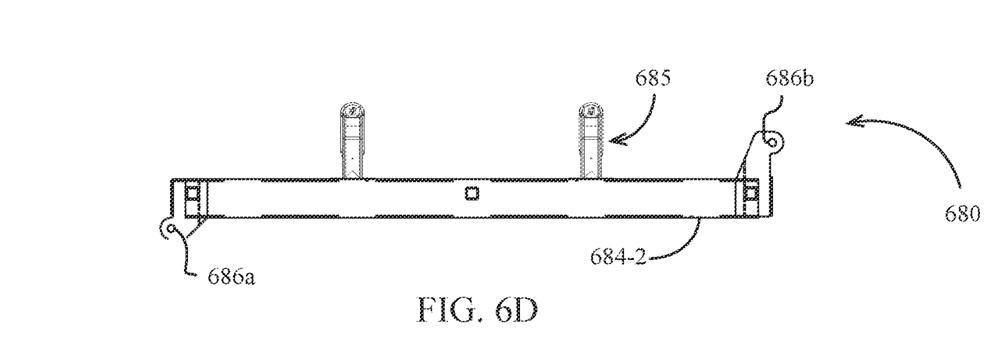
FIG. 6D is a side elevation view of the conveyor section of FIG. 6B in an operational configuration.

Referring to FIG. 6B-6D, an embodiment of a foldable conveyor section 680 is illustrated in the folded position (FIG. 6B) and in the unfolded position (FIG. 6C and FIG. 6D). The conveyor section 680 optionally includes a plurality of lateral supports 682 which are optionally coupled (e.g., pivotally, removably, etc.) to both side rails 684-1, 684-2 of the conveyor section 680. The conveyor section 680 optionally includes a plurality of idler assemblies 685 (e.g., troughing idler assemblies, etc.) which are optionally coupled (e.g., pivotally, removably, etc.) to both side rails 684-1, 684-2 of the conveyor section 680. In some embodiments, coupling points 686 (e.g., holes provided in coupling plates or other structure) are optionally used to couple the conveyor section 680 to adjacent conveyor sections (e.g., in the operational configuration). In some embodiments, the idler assemblies 685 are removed prior to folding the conveyor section 680 into the folded position. In other embodiments, the idler assemblies 685 are pivotally coupled to side rails 684 and pivot between folded and unfolded positions as the conveyor section is folded.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor, the conveyor having a transport configuration in which the conveyor is collapsed in a first direction and supported on a transport apparatus for transport along a travel direction opposite the first direction, the conveyor having an operational configuration in which the conveyor is expanded in the first direction and at least partially supported apart from the transport apparatus, the conveyor comprising:
a plurality of conveyor sections, each conveyor section supporting a plurality of spaced conveyor idler assemblies, each conveyor section being slidingly connected to an adjacent conveyor section, wherein each conveyor section is generally upright in the transport configuration, wherein each conveyor section is generally horizontal in the operational configuration, wherein said each said conveyor section comprises a slot.

2. The conveyor of claim 1, wherein at least some of said idler assemblies face rearward in the transport configuration, wherein said idler assemblies face upward in the operational configuration.

3. The conveyor of claim 1, wherein said slot is slidingly engaged by an adjacent conveyor section.

4. The conveyor of claim 1, wherein said slot is slidingly engaged by a pin of an adjacent conveyor section.

5. The conveyor of claim 4, wherein said pin is mounted on a plate, said plate mounted to said adjacent conveyor section.

6. The conveyor of claim 1, wherein each said conveyor section comprises one or more support legs, each said support leg engaging the ground in the operational configuration.

7. The conveyor of claim 1, further comprising: a head section, said head section operably coupled to one of said conveyor sections.

8. The conveyor of claim 7, further comprising: a tail section, said tail section operably coupled to one of said conveyor sections.

9. The conveyor of claim 1, further comprising: a tail section, said tail section operably coupled to one of said conveyor sections.

10. The conveyor of claim 1, wherein each conveyor section is pivotally connected to an adjacent conveyor section.

11. The conveyor of claim 10, wherein each conveyor section has an intermediate position between the transport configuration and the operational configuration, wherein said conveyor section is disposed at a non-zero angle relative to horizontal in said intermediate position.

12. The conveyor of claim 1, wherein each conveyor section has an intermediate position between the transport configuration and the operational configuration, wherein said conveyor section is disposed at a non-zero angle relative to horizontal in said intermediate position.

13. The conveyor of claim 1, wherein each conveyor section has an intermediate position between the transport configuration and the operational configuration, wherein in said intermediate position a forward end of said conveyor section is disposed vertically higher than a rearward end of said conveyor section.

14. A method of reconfiguring a conveyor from a transport configuration in which the conveyor is collapsed in a first direction and supported on a transport apparatus for transport along a travel direction opposite the first direction into an operational configuration in which the conveyor is expanded in the first direction and at least partially supported apart from the transport apparatus, the method comprising:
  moving a rearward end of a first conveyor section off of the transport apparatus;
  by a slot in a second conveyor section adjacent to said first conveyor section, sliding a forward end of said first conveyor section downward relative to the second conveyor section;
  pivoting said first conveyor section from an upright orientation to a horizontal orientation; and
  supporting said first conveyor section on a ground surface rearward of the transport apparatus.

15. The method of claim 14, further comprising:
  moving a rearward end of said second conveyor section off of the transport apparatus;
  sliding a forward end of said second conveyor section downward relative to a third conveyor section adjacent to said second conveyor section;
  pivoting said second conveyor section from an upright orientation to a horizontal orientation; and
  supporting said second conveyor section on a ground surface rearward of the transport apparatus.

16. The method of claim 14, wherein said sliding step and said pivoting step are simultaneous.

17. The method of claim 14, wherein said sliding step and said pivoting step are at least partly simultaneous.

18. A method of reconfiguring a conveyor from a transport configuration in which the conveyor is collapsed in a first direction and supported on a transport apparatus for transport along a travel direction opposite the first direction into an operational configuration in which the conveyor is expanded in the first direction and at least partially supported apart from the transport apparatus, the method comprising:
  at least partially supporting first and second conveyor sections by supporting a pivotal connection between the first and second conveyor sections;
  moving a rearward end of a said first conveyor section off of the transport apparatus;
  pivoting said first conveyor section from an upright orientation to a horizontal orientation; and
  supporting said first conveyor section on a ground surface rearward of the transport apparatus.

19. The method of claim 18, wherein said step of supporting first and second conveyor sections by supporting a pivotal connection is carried out by an upper rail of the transport apparatus.

* * * * *